(12) United States Patent
Wehrs et al.

(10) Patent No.: US 11,376,896 B2
(45) Date of Patent: Jul. 5, 2022

(54) STAGGER STICK

(71) Applicant: Wehrs Machine & Racing Products, Inc., Bangor, WI (US)

(72) Inventors: Chad Larry Wehrs, West Salem, WI (US); Dan Fredrickson, Northfield, MN (US)

(73) Assignee: Wehrs Machine & Racing Products, Inc., Bangor, WI (US)

( * ) Notice: Subject to any disclaimer, the term of this patent is extended or adjusted under 35 U.S.C. 154(b) by 0 days.

(21) Appl. No.: 17/092,005

(22) Filed: Nov. 6, 2020

(65) Prior Publication Data
US 2022/0144021 A1    May 12, 2022

(51) Int. Cl.
| | |
|---|---|
| *G01B 7/12* | (2006.01) |
| *B60C 19/00* | (2006.01) |
| *G01B 3/16* | (2006.01) |
| *G01B 3/1069* | (2020.01) |
| *G01B 5/08* | (2006.01) |

(52) U.S. Cl.
CPC ............ *B60C 19/00* (2013.01); *G01B 3/1069* (2020.01); *G01B 3/16* (2013.01); *G01B 5/08* (2013.01); *G01B 7/12* (2013.01); *B60C 2019/004* (2013.01)

(58) Field of Classification Search
CPC .......... G01B 3/1069; G01B 3/20; G01B 3/38; G01B 5/0025; G01B 5/08; G01B 7/12
USPC ................................... 33/203, 783, 810, 811
See application file for complete search history.

(56) References Cited

U.S. PATENT DOCUMENTS

| | | | | |
|---|---|---|---|---|
| 1,363,825 | A * | 12/1920 | Taylor .................... | G01B 3/20 33/203 |
| 2,566,435 | A * | 9/1951 | Trimmer ................ | G01B 5/08 33/203.16 |
| 3,507,048 | A * | 4/1970 | Owens ................... | G01B 5/213 33/610 |
| 3,827,153 | A * | 8/1974 | Mitchell ................ | G01B 5/14 33/610 |
| 4,607,436 | A * | 8/1986 | Clay ....................... | G01B 3/20 33/1 D |
| 5,398,419 | A * | 3/1995 | Schmidt, Jr. ......... | G01B 5/0025 33/203 |
| 5,509,208 | A * | 4/1996 | Oja ........................ | G01B 5/143 33/203 |
| 6,205,672 | B1 * | 3/2001 | Paulsen ................. | G01B 3/205 33/203 |
| 6,634,114 | B2 * | 10/2003 | Bidwell ................ | G01B 5/0004 33/542 |
| 6,957,498 | B2 * | 10/2005 | Tsai ...................... | G01B 3/205 33/610 |
| 7,150,105 | B1 * | 12/2006 | Battaglia ............... | G01B 5/255 33/203.18 |

(Continued)

*Primary Examiner* — George B Bennett
(74) *Attorney, Agent, or Firm* — Craig R. Miles; CR Miles P.C.

(57) ABSTRACT

Generally, a device to measure the circumference of circular objects. Specifically, a device including a pair of slidingly engaged members disposed between a pair of arms configured to be engaged with tread on a tire at about the midline of a wheel, an electrical circuit which varies in output voltage based on the distance between the pair of arms, and a processor communicatively coupled to a non-transitory computer readable medium containing a program which correlates the output voltage of the electrical circuit to a unit measure of distance between the pair of arms and calculates tire circumference.

15 Claims, 7 Drawing Sheets

(56) References Cited

U.S. PATENT DOCUMENTS

| | | | | |
|---|---|---|---|---|
| 9,228,819 B2* | 1/2016 | Pruitt | ............... | G01B 5/255 |
| 9,982,998 B2* | 5/2018 | D'Agostino | ....... | G01B 11/2755 |
| 10,533,847 B2* | 1/2020 | Su | ..................... | G01B 7/02 |
| 2012/0330607 A1* | 12/2012 | Mathis | ............. | G01B 3/1061 |
| | | | | 702/157 |

* cited by examiner

STAGGER STICK

I. FIELD OF THE INVENTION

Generally, a device to measure the circumference of circular objects. Specifically, a device including a pair of slidably engaged members disposed between a pair of arms configured to engage a tread on a tire at about the midline of a wheel, an electrical circuit which varies in output voltage based on the distance between the pair of arms, and a processor communicatively coupled to a non-transitory computer readable medium containing a program which correlates the output voltage of the electrical circuit to a unit measure of distance between the pair of arms and calculates tire circumference.

II. BACKGROUND OF THE INVENTION

Stagger is the difference of circumference of two tires. It cannot be assumed that that the size stamped on two tires will be the same when the tires are mounted on the wheels and aired up. On the front of the chassis measure the difference in circumference between the left front and the right front tire. On the rear of the chassis, measure the difference in circumference between the left rear tire and the right rear tire. In the example of a circular track turning left, stagger is required to make the smaller tire turn the same number of rotations as the larger tire as they rotate through a radius of the circular track. If the stagger on a pair of tires mounted to an axle of a chassis is correct, then the chassis will move along the circular track without veering off in one direction or the other direction. The tighter the radius of the circular track—the greater the required stagger. The larger the radius of the circular track—the lesser the required stagger. Typically, in normal city and highway driving on substantially flat or banked pavement, tires can be aired up to reduce or eliminate stagger.

Conventionally, there are two ways to measure stagger. First, a narrow flexible tape measure can be disposed around each tire at the center of the tread pattern. The tape measure can be pulled taught and the measure of the circumference of each tire can be obtained. Second, a stagger stick including an outer tube telescopingly engaged to an inner tube can be disposed between a pair of outwardly extending arms. The pair of arms can be disposed on the tread of the tire at the wheel centerline. The end of the outer tube moves along a gauge imprinted on the inner tube. The pair of arms correspondingly engaged to the tread of the tire aligns the end of the outer tube on the imprinted gauge which provides a measure of the diameter of the tire.

The measure of tire circumference using the tape measure necessitates removal of the tire from the chassis or the chassis must be elevated to raise the tire above the ground. Additionally, any dirt or debris must be removed from the tire or the measure of circumference obtained will be incorrect. Additionally, there is considerable labor and time involved to measure two tires using a tape measure.

The measure of tire circumference using a conventional stagger stick necessitates aligning the end of the outer tube with the imprinted gauge. In particular racing environments, such as dirt tracks, the gauge can be obscured by dirt. Additionally, the end of the outer tube may fall between imprinted measure marks on the gauge. For example, gauges are often demarcated in one-quarter inch increments. The end of the outer tube may fall between two marks on the gauge necessitating the user to guess the actual measure. Additionally, the gauge may provide a measure of the diameter of the tire and not the circumference of the tire necessitating conversion of the diameter measure to a circumference measurement discrete from the stagger stick. Moreover, the measurement of the first tire and the measurement of the second tire must be recorded discrete from use of a conventional stagger stick and subsequently compared and the stagger determined outside of the use of the stagger stick. All of which can introduce error in the measure of circumference and the corresponding stagger.

III. SUMMARY OF THE INVENTION

Accordingly, there would be an advantage in providing a device including a pair of slidably engaged members disposed between a pair of arms configured to be engaged with a tread of a tire at about the midline of a wheel, an electrical circuit which varies in output voltage based on the distance between the pair of arms, and a processor communicatively coupled to a non-transitory computer readable medium containing a program which correlates the output voltage of the electrical circuit to a unit measure of distance between the pair of arms, calculates a tire circumference, and implements a user interface including a numeric display to read out the tire circumference in a customary system of measurement units. In particular embodiments, by user indications in the user interface, the program can implement measurement of a first tire circumference, record the first tire circumference, and read out the first tire circumference on the numeric display, and by user indications in the user interface, implement a second tire circumference measurement, record the second tire circumference and read out the second tire circumference on the numeric display, and further calculate the stagger between the first and second tire circumference measurements, record the stagger and read out the stagger on the numeric display.

Another object of particular embodiments of the invention can be a method of making a device including slidably engaging a first body member to a second body member and outwardly extending a first of a pair of arms extends from the body first end, and outwardly extending a second of the pair of arms from the body second end, wherein the first body member slidably engaged to the second body member allows distance to vary between the pair of arms. The method can further include disposing an electrical circuit within the body of the device, wherein output voltage of the electrical circuit varies based on the distance between the pair of arms. The method can further include communicatively coupling a processor to a non-transitory computer readable medium containing a program executable to correlate the output voltage in the electrical circuit to the distance between the pair of arms and calculate a circumference of a circle corresponding to the distance between the pair of arms. The method can further include disposing a user interface including a numeric display within the body of the device, wherein the program can be further executed to read out the circumference of the circle corresponding to the distance between the pair of arms in measurement units on said numeric display. In particular embodiments, the program can implement a circumference measurement of a first circle, record the circumference of the first circle and read out the circumference of the first circle on the numeric display, implement a circumference measurement of a second circle, record the circumference of the second circle and read out the circumference of the second circle on the numeric display, and can further calculate the difference between the first and second circle circumference measurements, record the difference and read out the difference on the numeric display.

Another object of particular embodiments of the invention can be a method of using a device to calculate the stagger between a pair of tires. The method can comprise obtaining a device including a body having a first body member slidably engaged to a second body member; a first of a pair of arms outwardly extending from the body first end, and a second of the pair of arms outwardly extending from said body second end, wherein said first body member slidably engaged to a second body member allows distance to vary between said pair of arms; an electrical circuit, wherein output voltage of said electrical circuit varies based on a distance between the pair of arms. The method can further include engaging the first and second of the pair of arms to a tread of a tire at about a midline of a wheel; activating a processor communicatively coupled to a non-transitory computer readable medium containing a program executable to correlate the output voltage of the electrical circuit to the distance between said pair of arms engaged to the tread of said tire; calculate a circumference of the tire based on the distance between the pair of arms engaged to the tread of said tire; implement a user interface including a numeric display; and read out the circumference of the tire based on the distance between the pair of arms engaged to the tread of the tire in measurement units on the numeric display. In particular embodiments, the method can further include executing the program to correlate the output voltage in the electrical circuit to a first distance between the pair of arms engaged to a tread of a first tire at a midline of a first wheel; calculate a first circumference of the first tire based on the first distance between the pair of arms engaged to the tread of the first tire; record the first circumference of the first tire in the non-transitory computer readable medium; and read out the first circumference of the first tire in measurement units on the numeric display. The method can further include executing the computer program to correlate the output voltage in the electrical circuit corresponding to a second distance between the pair of arms engaged to a tread of a second tire at a midline of a second wheel; calculate a second circumference of the second tire corresponding to the second distance between the pair of arms engaged to the tread of the second tire at the midline of the second wheel; record the second circumference of the second tire in the non-transitory computer readable medium; and read out the second circumference of the second tire in measurement units on the numeric display. The method can further include executing the program to calculate a difference in the first circumference of the first tire and the second circumference of the second tire recorded in the non-transitory computer readable medium; and read out the difference in the first circumference of the first tire and the second circumference of the second tire in measurement units on the numeric display; and reading the numeric display to obtain stagger between the first tire and the second tire.

Naturally, further objects of the invention are disclosed throughout other areas of the specification, drawings, photographs, and claims.

IV. BRIEF DESCRIPTION OF THE DRAWINGS

V. DETAILED DESCRIPTION OF THE INVENTION

Figure 1:
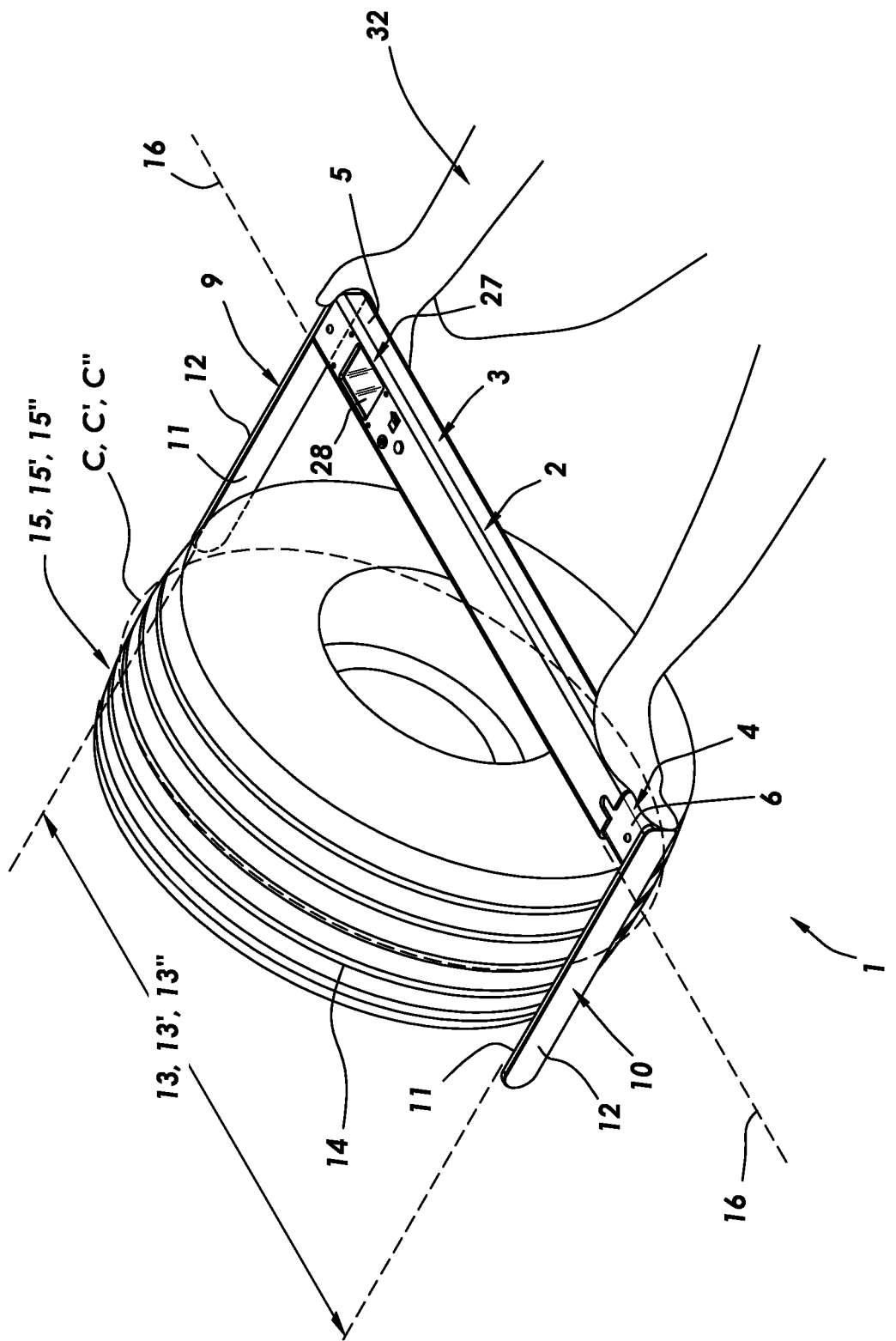
FIG. 1 is a perspective view which illustrates a particular method of using an embodiment of the inventive device.

Now, with primary reference to FIGS. 1 through 4, embodiments of the invention can include a device (1) having one or more of: a body (2) having a first body member (3) slidably engaged to a second body member (4) between a body first end (5) and a body second end (6). In the illustrative examples shown in the Figures, the first body member (3) and the second body member (4) comprise rectangular tubular members which telescopingly engage to afford a body length (7)(as shown in the example of FIG. 3A) which can vary by application of push-pull forces (PPF) on the first and second body members (3)(4) without substantial rotation of the first and second body members (3)(4) about the body longitudinal axis (8) (as shown in the example of FIG. 3A); however, these illustrative examples are not intended to preclude embodiments in which the first and second body member (3)(4) are not tubular but have portions that slidably overlap, for example a first body member (3) being a substantially flat member which slidably travels in a second body member (4) being an open sided channel.

Again, with primary reference to FIGS. 1 through 4, embodiments of the invention can further include a pair of arms (9)(10). The first of the pair of arms (9) outwardly extends from the body first end (5) and the second of the pair of arms (10) outwardly extends from the body second end (6), the first body member (3) slidably engaged to a second body member (4) allows a distance (13) between said pair of arms (9)(10) to vary by application of push-pull forces to the pair arms (9)(10). As shown in the illustrative examples of the Figures, the pair of arms (9)(10) comprise a flat linear inner surface (11) opposite a flat linear outer surface (12); however, this is not intended to preclude embodiments in which the pair of arms (9)(10) comprise cylindrical, hemispherical or other configurations. Now, with primary reference to FIG. 1, in particular embodiments the inner surfaces (11) can comprise a configuration to correspondingly engage a tread (14) of a tire (15) at about a midline of a wheel (16).

Figure 3A:
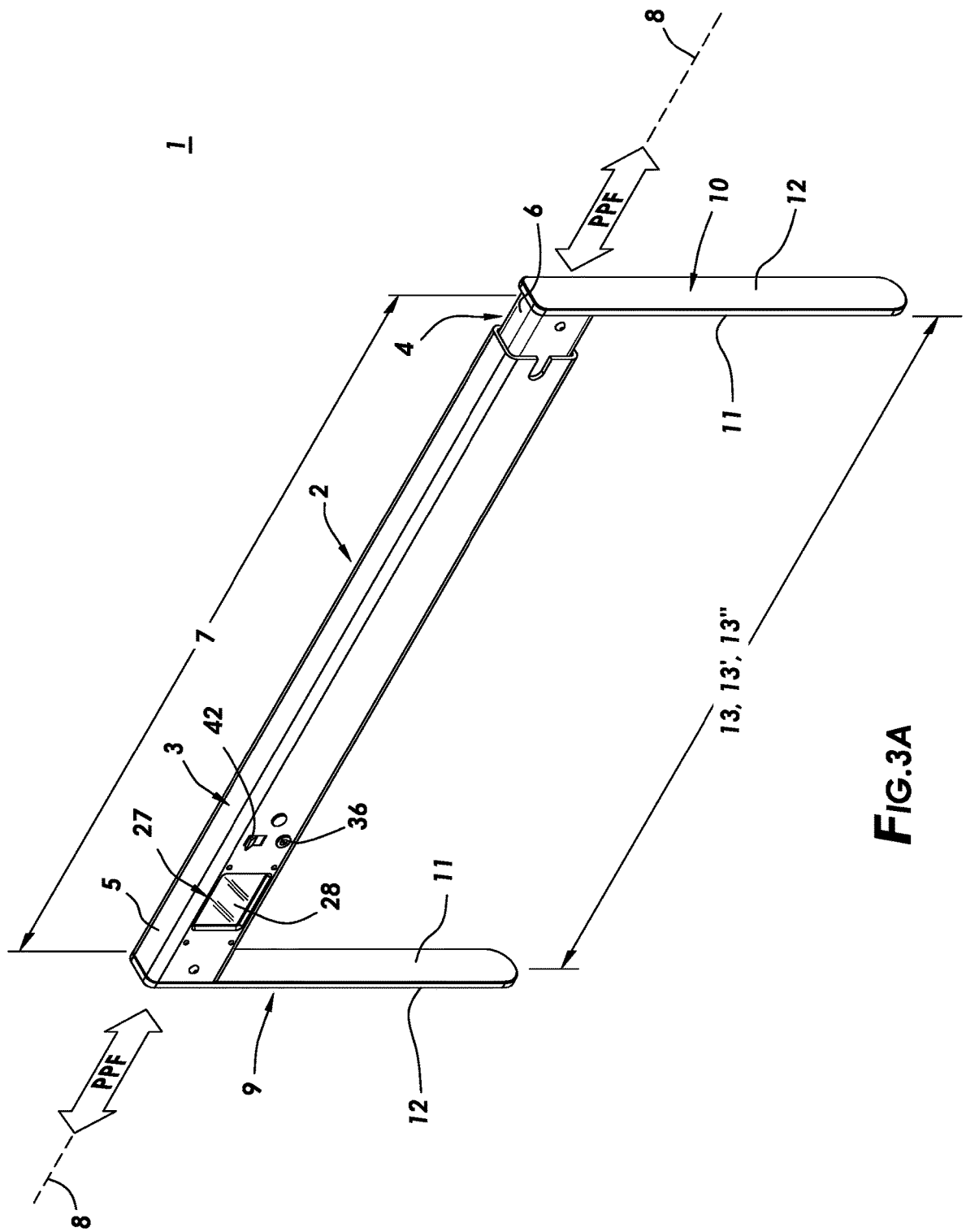
FIG. 3A is perspective view of a particular embodiment of the inventive device.
Figure 3B:
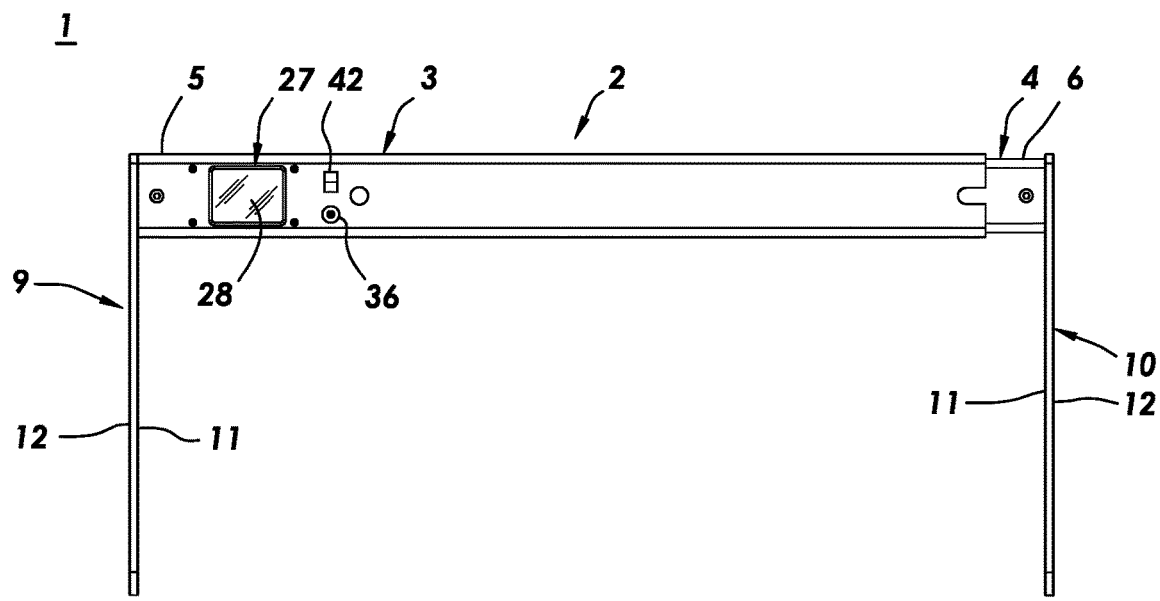
FIG. 3B is a first side elevation view of a particular embodiment of the inventive device.
Figure 3C:
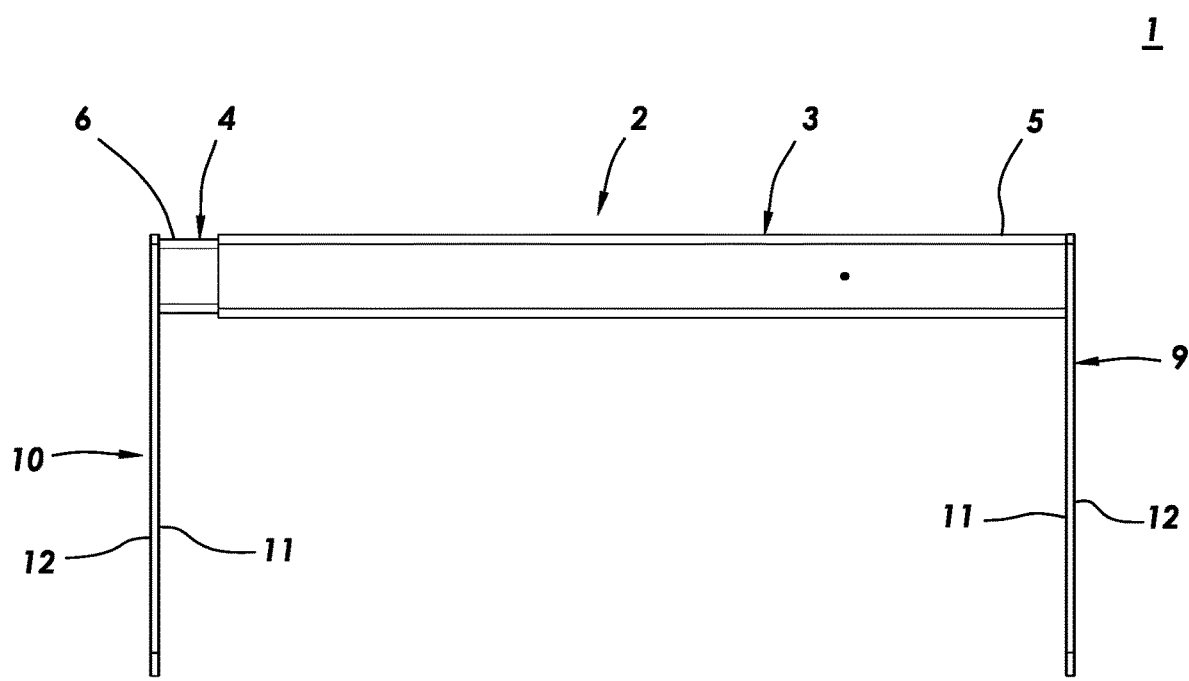
FIG. 3C is a second side elevation view of a particular embodiment of the inventive device.
Figure 3D:
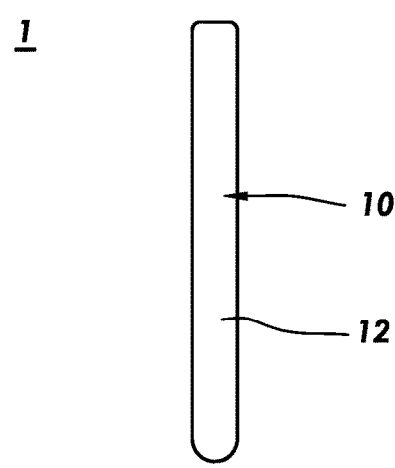
FIG. 3D is a first end elevation view of a particular embodiment of the inventive device.
Figure 3E:
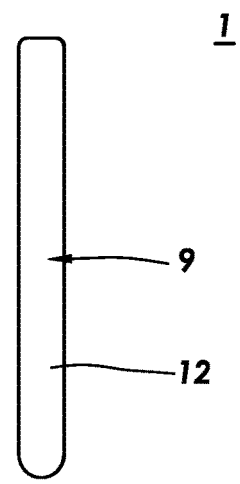
FIG. 3E is a second end elevation view of a particular embodiment of the inventive device.
Figure 3F:
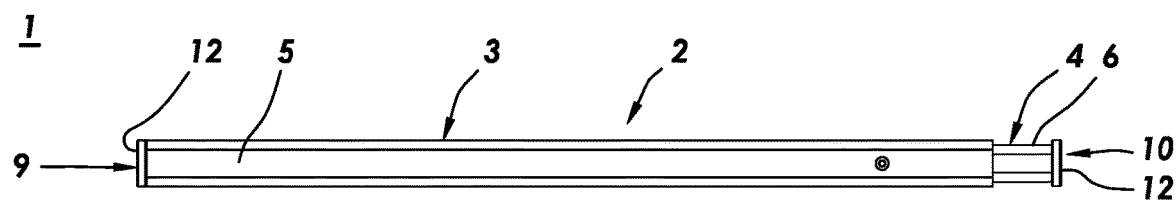
FIG. 3F is top plan view of a particular embodiment of the inventive device.
Figure 3G:
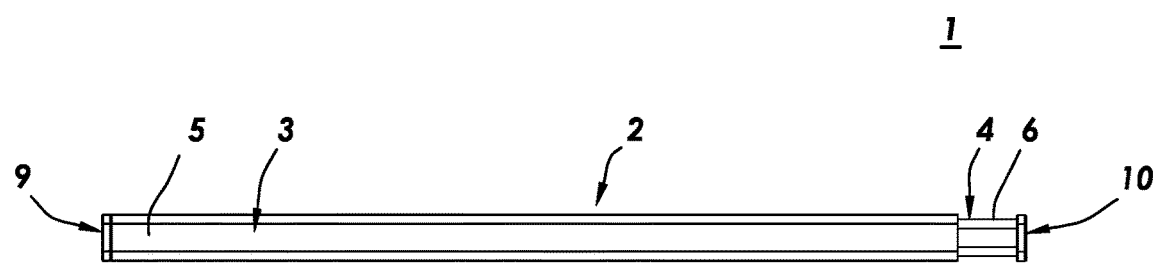
FIG. 3G is a bottom plan view of a particular embodiment of the inventive device.
Figure 4:
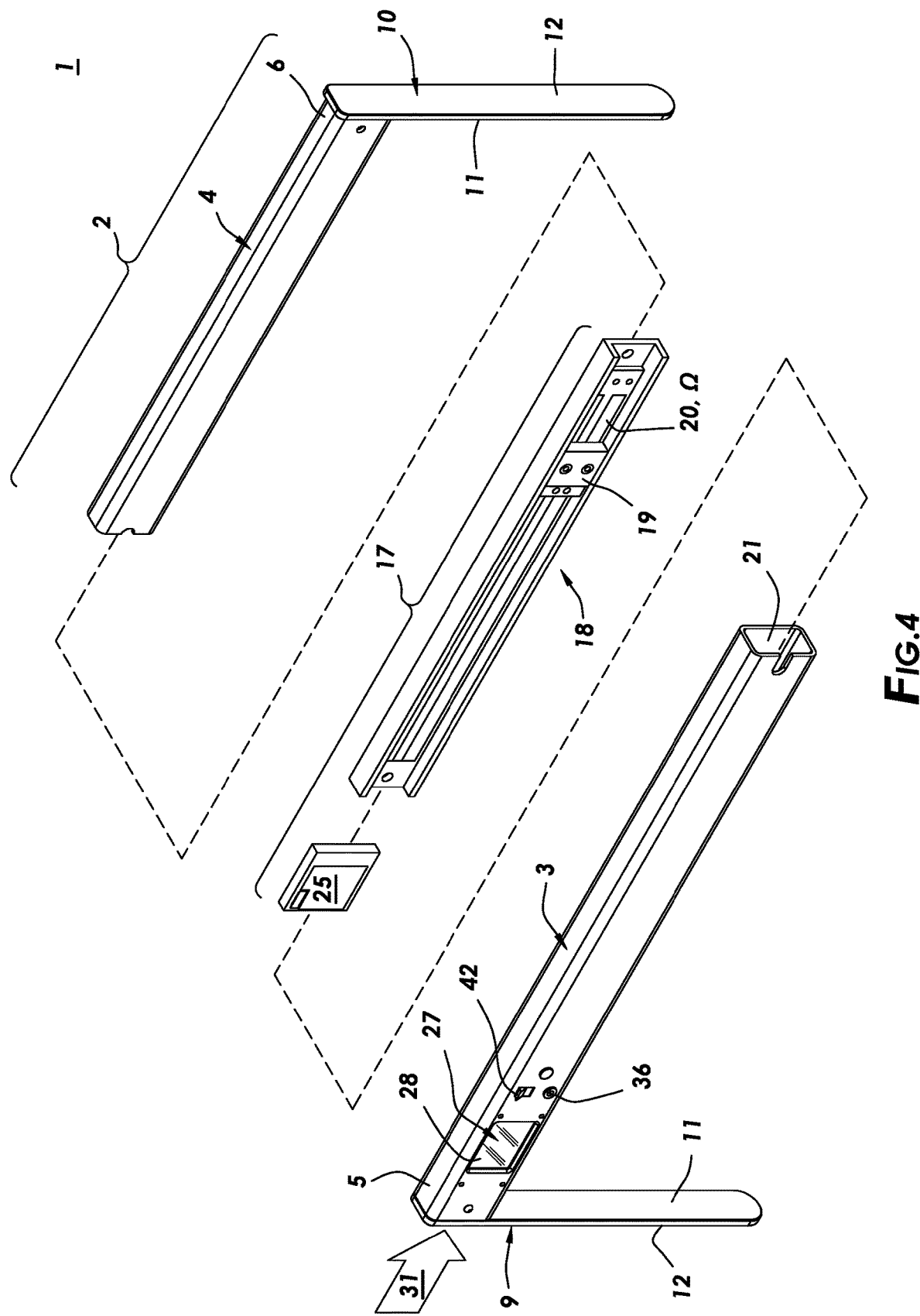
FIG. 4 is an exploded view of a particular embodiment of the inventive device.
Figure 5:
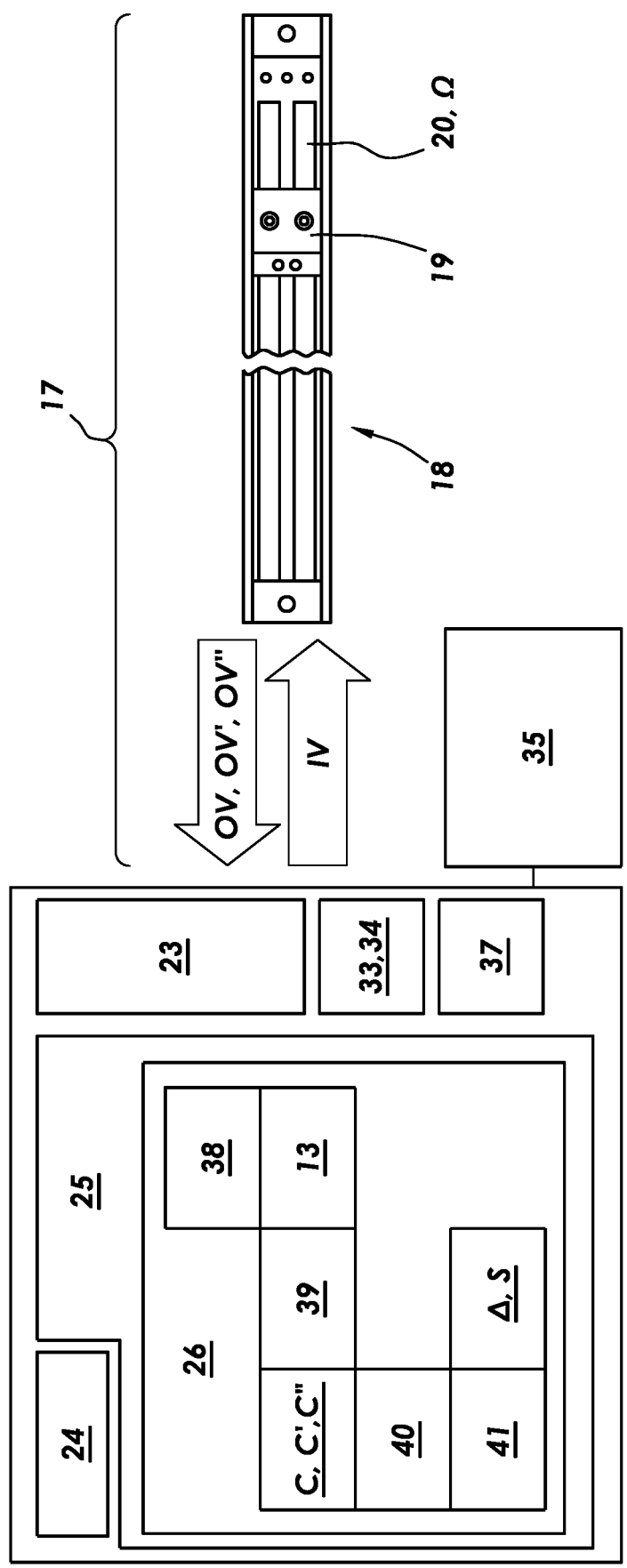
FIG. 5 is block diagram of a particular embodiment of an electrical circuit which generates a variable output voltage based on distance between a pair of arms of the device and by operation of a processor communicatively coupled to a non-transitory computer readable medium containing a program executable to covert the output voltage to circumference.

Now, with primary reference to FIGS. 4 and 5, embodiments can further include an electrical circuit (17) in which the resistance (Ω) of the electrical circuit (17) varies based on the distance (13) between the pair of arms (9)(10)(as shown in the illustrative example of FIGS. 1 and 3A). As an illustrative example, the electrical circuit (17) can in part include potentiometer (18) which provides a sliding contact (19) which moves along a resistance track (20). The potentiometer (18) can be mounted in or to the body (2) of the device (1) in a manner which fixes the spatial location of the resistance track (20) in regard to one of the first or second body member (3)(4) and couples the sliding contact (19) to the other of the first or second body member (3)(4). Thereby, varying distance (13) between the pair of arms (9)(10)(as shown in the example of FIGS. 1 and 3A) correspondingly moves the sliding contact (19) along the resistance track (20) to correspondingly increase or decrease the resistance (Ω) of the electrical circuit (17). In the illustrative examples shown in the Figures, the potentiometer (18) can be mounted inside of the interior space (21) defined by the telescoping engagement of the first and second body members (3)(4). The resistance track (20) can be mounted in fixed spatial relation to the first body member (3) and the sliding contact (19) can be coupled to the second body member (4). Thereby, extension or retraction of the body (2) correspondingly moves the sliding contact (19) along the resistance track (20) to change the resistance (1) of the electrical circuit (17) in direct proportion to the change in distance (13) between the pair of arms (9)(10). While the potentiometer (18) shown in the Figures comprises a linear potentiometer in which the sliding contact (19) moves linearly along the resistance track (20); other potentiometers can be utilized including rotary potentiometers where the sliding contact (19) responds to rotation of a shaft to move in a circular path over a circular resistance track (20), where the shaft can be rotatably coupled to the extension and retraction of the first and second body members (3)(4), membrane potentiometers, digital potentiometers, or the like.

Now, with primary reference to FIG. 5, a fixed input voltage (IV), typically direct current (DC), can be applied across the two ends of the resistive track (20), and the potentiometer (18) can be used to provide a variable output voltage (OV) at the sliding contact (19). The potentiometer (18) can provide a continuously varying output voltage (OV) proportional to distance (13) between the pair of arms (9)(10). An analog signal interface (23) coupled to a processor (24) communicatively coupled to a non-transitory computer readable medium (25) containing a program (26) can be used to continuously measure the analog output voltage (OV). As an illustrative example, a fixed input voltage (IV) of five volts applied to the resistive track (20) can be adjusted by movement of the sliding contact (19) to generate a continuously varying output voltage (OV) of between zero and five volts. The program (26) can include a output voltage correlator (38) which can be executed to correlate the measured output voltage (OV) in the electrical circuit (17) to the distance (13) between the pair of arms (9)(10) of the device (2). The program (26) can further include a circumference calculator (39) which can be further executed to calculate the circumference (C) of a circle by applying the formula C=πd, where π equals about 3.141 and where the diameter (d) corresponds to the distance (13) between the pair of arms (9)(10). In those embodiments in which the pair of arms (9)(10) engage the tread (14) of a tire (15) at the midline of a wheel (16) the distance (13) equals the diameter (d) of the tire (15) and the circumference of the circle (C) equals the circumference of the tire (15).

Now, with primary reference, to FIGS. 2 and 3A through 3G and 4 and 5, the program (26) can be further executed to implement a user interface (27) including a numeric display (28) which reads out the calculated circumference (C) of a circle or tire (15) based on the distance (13) between the pair of arms (9)(10) in measurement units (29) which define the magnitude of the circumference (C), and can be measurement units in any customary system of measurement, for example, the US customary system including measurement units in inches, feet, yards, or in the metric system including measurement units in millimeters, centimeters or meters, or can toggle between different measurement units. The numeric display (28) can, as illustrative, examples be a liquid crystal display which allows display of pictures and text or can be segment display including light emitting diodes for displaying decimal numerals, as an alternative to the more complex dot matrix displays.

Figure 2:
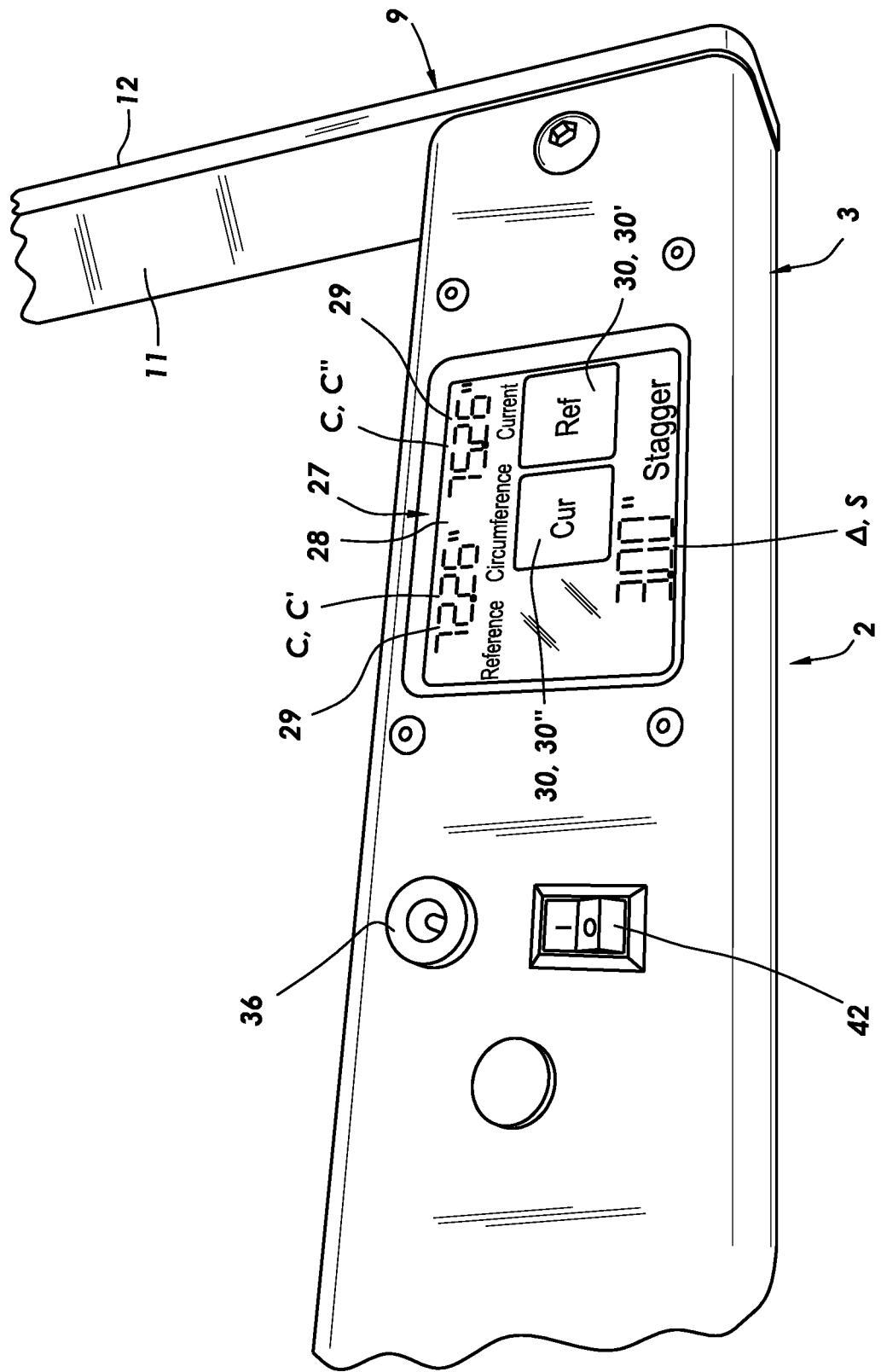
FIG. 2 is an enlarged portion of FIG. 1 depicting the numerical display and user interface of a particular embodiment of the invention.

Now with primary reference to FIGS. 1, 2 and 5, in particular embodiments, the output voltage correlator (38) can be executed to correlate a first output voltage (OV') in the electrical circuit (17) to a first distance (13') between the pair of arms (9)(10) and to calculate a first circumference (C) of a first circle (C') or first tire (15') corresponding to the first distance (13') between said pair of arms (9)(10). The program (26) can further include a circumference recorder (40) which functions to record the first circumference (C) of the first circle (C') or first tire (15') in the non-transitory computer readable medium (25), and can further read out the first circumference (C) of the first circle (C') or first tire (15') in the measurement units (29) on the numeric display (28). The output voltage correlator (38) can be further executed to correlate a second output voltage (OV") in the electrical circuit (17) to a second distance (13") between the pair of arms (9)(10) and to calculate a second circumference (C) of a second circle (C") or a second tire (15") corresponding to a second distance (13") between said pair of arms (9)(10). The circumference recorder (40) can further function to record the second circumference (C) of the second circle (C") or second tire (15") in the non-transitory computer readable medium (25), and can further read out the second circumference (C") of the second circle (c") or second tire (15") in the measurement units (29) on said numeric display (28). As shown in the illustrative example of FIG. 2, the first circumference (C') and the second circumference (C") can be concurrently displayed on the numeric display (28) for ready comparison.

Again, with primary reference to FIGS. 1 and 5, in particular embodiments, the program (26) includes a stagger calculator (41) which can be executed to calculate the difference (Δ) in circumference (C) between calculated circumference of the first and second circles (C', C") or first and second tires (15', 15") recorded in the non-transitory computer readable medium (25); and read out the difference (Δ) in circumference (C) between the first and second circles (C', C") or the first and second tires (15', 15") in the measurement units (29) on the numeric display (28). As shown in the example of FIG. 2, the first circumference (C'), the second circumference (C"), and the difference (Δ) in circumference (C) can be concurrently displayed. The difference (Δ) in circumference (C) between calculated circumference (C) the first and second tires (15', 15") equals the stagger (S) between the first and second tire (15', 15").

Now, with primary reference to FIGS. 1 and 2, in particular embodiments, the program (26) can implement stepwise presentation of user input elements (30) which by user interaction (31) stepwise further activates the program (26) and guides a user (32) through the steps of obtaining stagger (S) between a first tire (15') and a second tire (15"). For example as shown in FIG. 1, a user (32) can engage the pair of arms (9)(10) with the tread (14) of a first tire (15'), and by interaction with a first input element (30') (depicted as "REFERENCE" or "REF")(as shown in the example of FIG. 2) can activate the program (26) to calculate the first circumference (C'), record the first circumference (C') in the non-transitory computer readable medium (25), and can further read out the first circumference (C') of the first tire (15') in the measurement units (29) on said numeric display (28). The program (26) can further depict a second input element (30") (depicted "CURRENT" or "CUR")(as shown in the example FIG. 2). The user (32) can then engage the pair of arms (9)(10) with the tread (14) of a second tire (15")(as shown in example of FIG. 1), and by interaction with the second input element (30") can activate the program (26) to calculate the second circumference (C"), record the second circumference (C") in the non-transitory computer readable medium (25), and can further read out the second circumference (C") of the second tire (15") in the measurement units (29) on said numeric display (28). The program (26) can then calculate the difference ($\Delta$) in circumference (C) between calculated circumference of the first and second tires (15', 15") recorded in the non-transitory computer readable medium (25); and read out the difference ($\Delta$) in circumference (C', C") between the first and second tires (15', 15") in the measurement units (29) on the numeric display (28). The difference ($\Delta$) in circumference (C', C") between the first and second tires (15', 15") being the stagger (S) between the first and second tires (15', 15").

Now with primary reference to FIGS. 2 and 5, embodiments of the device (1) can further include a power source (33) which can comprise batteries (34) removably contained in the body (2) of the device (1), or the device (1) can include an external power supply (35), as examples, an AC adapter, AC/DC adaptor or AC/DC converter power port (36), which includes a plug or a connector which mates with a power port (36) of the device (1). In particular embodiments, the device (1) can include a battery recharging circuit (37) operable to recharge batteries (34) contained within the device (1). A power switch (42) can be coupled to the power source (33) to switchably connect or disconnect power to the electrical circuit (18).

As can be easily understood from the foregoing, the basic concepts of the present invention may be embodied in a variety of ways. The invention involves numerous and varied embodiments of a stackable jewelry system and methods for making and using such a stackable jewelry system.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or an element which causes that action. Similarly, each element of an apparatus may be disclosed as the physical element or the action which that physical element facilitates. As but one example, the disclosure of a "display" should be understood to encompass disclosure of the act of "displaying"—whether explicitly discussed or not—and, conversely, were there effectively disclosure of the act of "displaying", such a disclosure should be understood to encompass disclosure of a "display" and even a "means for displaying". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the devices herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A device, comprising:
   a body having a first tubular body member slidably telescopingly engaged to cover a second tubular body member between a body first end and a body second end;
   a pair of arms, wherein a first of said pair of arms outwardly extends from said body first end, and wherein a second of said pair of arms outwardly extends from said body second end, wherein said first body member slidably engaged to a second body member allows a distance to vary between said pair of arms;
   an electrical circuit, wherein output voltage of said electrical circuit varies based on said distance between said pair of arms;
   a processor communicatively coupled to a non-transitory computer readable medium containing a program executable to:
   correlate the output voltage in said electrical circuit to said distance between said pair of arms;
   calculate a circumference of a circle corresponding to said distance between said pair of arms;
   implement a user interface including a numeric display; and
   read out said circumference of said circle corresponding to said distance between said pair of arms in measurement units on said numeric display.

2. The device of claim 1, wherein said first tubular body member configured to cover the entire length of the second tubular body member.

3. The device of claim 2, wherein said electrical circuit disposed inside of said first tubular body member.

4. A device, comprising:
   a body having a first body member slidably engaged to a second body member between a body first end and a body second end;
   a pair of arms, wherein a first of said pair of arms outwardly extends from said body first end, and wherein a second of said pair of arms outwardly extends from said body second end, wherein said first body member slidably engaged to a second body member allows distance to vary between said pair of arms to allow said first and second pair of arms to correspondingly engage a tread of a tire at about a midline of a wheel;
   an electrical circuit associated with said body, wherein said electrical circuit comprises a resistance track mounted in fixed spatial relation inside said first body member and a sliding contact coupled to said second body member, said sliding contact moves along said resistance track, wherein output voltage of said electrical circuit varies based on a distance between said pair of arms engaged to said tread of said tire;
   a processor communicatively coupled to a non-transitory computer readable medium containing a program executable to:
   correlate said output voltage of said electrical circuit to said distance between said pair of arms engaged to said tread of said tire;
   calculate a circumference of said tire based on said distance between said pair of arms engaged to said tread of said tire;
   implement a user interface including a numeric display; and
   read out said circumference of said tires based to said distance between said pair of arms engaged to said tread of said tire in measurement units on said numeric display.

5. The device of claim 4, wherein said program further executable to:
   correlate the amount of resistance in said electrical circuit to a first distance between said pair of arms engaged to a tread of a first tire at a midline of a first wheel;
   calculate a first circumference of said first tire based on said first distance between said pair of arms engaged to said tread of said first tire;

record said first circumference of said first tire in said non-transitory computer readable medium;
read out said first circumference of said first tire in said measurement units on said numeric display;
correlate the amount of resistance in said electrical circuit corresponding to a second distance between said pair of arms engaged to a tread of a second tire at a midline of a second wheel;
calculate a second circumference of said second tire corresponding to said second distance between said pair of arms engaged to said tread of said second tire at said midline of said second wheel;
record said second circumference of said second tire in said non-transitory computer readable medium; and
read out said second circumference of said second tire in said measurement units on said numeric display;
calculate a difference in said first circumference of said first tire and said second circumference of said second tire recorded in said non-transitory computer readable medium; and
read out said difference in said first circumference of said first tire and said second circumference of said second tire in said measurement units on said numeric display.

6. The device of claim 5, wherein said difference in said first circumference of said first tire and said second circumference of said second tire comprises the stagger between said first tire and said second tire.

7. A method of making a device, comprising:
slidably telescopingly engaging a first tubular body member to cover a second body member of a body between a body first end and a body second end;
outwardly extending a pair of arms from said body, wherein a first of said pair of arms outwardly extends from said body first end, and wherein a second of said pair of arms outwardly extends from said body second end, wherein said first body member slidably engaged to a second body member allows a distance to vary between said pair of arms;
associating an electrical circuit with said body, wherein output voltage of said electrical circuit varies based on said distance between said pair of arms;
communicatively coupling a processor to a non-transitory computer readable medium containing a program, and executing said program to:
correlate the output voltage in said electrical circuit to said distance between said pair of arms;
calculate a circumference of a circle corresponding to said distance between said pair of arms;
implement a user interface including a numeric display; and
read out said circumference of said circle corresponding to said distance between said pair of arms in measurement units on said numeric display.

8. The method of claim 7, wherein said first tubular body member configured to cover the entire length of the second tubular body member.

9. The method of claim 8, wherein said program further executable to:
correlate said output voltage of said electrical circuit to a first distance between said pair of arms, wherein said electrical circuit comprises a resistance track mounted in fixed spatial relation inside said first body member and a sliding contact coupled to said second body member, said sliding contact moves along said resistance track;
calculate a first circumference of a first circle corresponding to said first distance between said pair of arms;
record said first circumference of said first circle in said non-transitory computer readable medium;
read out said first circumference of said first circle in said measurement units on said numeric display;
correlate said output voltage of said electrical circuit corresponding to a second distance between said pair of arms;
calculate a second circumference of a second circle corresponding to said second distance between said pair of arms;
record said second circumference of said second circle in said non-transitory computer readable medium; and
read out said second circumference of said second circle in said measurement units on said numeric display:
calculate a difference in circumference between calculated circumference of said first and second circles recorded in said non-transitory computer readable medium; and
read out said difference in circumference between said first and second circles in said measurement units on said numeric display.

10. A method of using a device, comprising:
obtaining said device including:
a body having a first tubular body member slidably telescopingly engaged to cover a second tubular body member between a body first end and a body second end;
a pair of arms, wherein a first of said pair of arms outwardly extends from said body first end, and wherein a second of said pair of arms outwardly extends from said body second end, wherein said first body member slidably engaged to a second body member allows distance to vary between said pair of arms;
an electrical circuit, wherein output voltage of said electrical circuit varies based on a distance between said pair of arms engaged to said tread of said tire;
engaging said first and second pair of arms to correspondingly engage a tread of a tire at about a midline of a wheel;
activating a processor communicatively coupled to a non-transitory computer readable medium containing a program executable to:
correlate said output voltage of said electrical circuit to said distance between said pair of arms engaged to said tread of said tire;
calculate a circumference of said tire based on said distance between said pair of arms engaged to said tread of said tire;
implement a user interface including a numeric display; and
read out said circumference of said tire based on said distance between said pair of arms engaged to said tread of said tire in measurement units on said numeric display.

11. The method of claim 10, wherein said program further executable to:
correlate the amount of resistance in said electrical circuit to a first distance between said pair of arms engaged to a tread of a first tire at a midline of a first wheel;
calculate a first circumference of said first tire based on said first distance between said pair of arms engaged to said tread of said first tire;
record said first circumference of said first tire in said non-transitory computer readable medium;
read out said first circumference of said first tire in said measurement units on said numeric display;

correlate the amount of resistance in said electrical circuit corresponding to a second distance between said pair of arms engaged to a tread of a second tire at a midline of a second wheel;

calculate a second circumference of said second tire corresponding to said second distance between said pair of arms engaged to said tread of said second tire at said midline of said second wheel;

record said second circumference of said second tire in said non-transitory computer readable medium; and read out said second circumference of said second tire in said measurement units on said numeric display.

12. The method of claim 11, wherein said program further executable to:

calculate a difference in said first circumference of said first tire and said second circumference of said second tire recorded in said non-transitory computer readable medium; and read out said difference in said first circumference of said first tire and said second circumference of said second tire in said measurement units on said numeric display.

13. The method of claim 12, further comprising:

reading said numeric display to visualize said difference between said first circumference of said first tire and said second circumference of said second tire; and reading said numeric display to visualize stagger between said first tire and said second tire.

14. The device of claim 2, wherein said electrical circuit comprises a resistance track mounted in fixed spatial relation inside said first body member and a sliding contact coupled to said second body member, said sliding contact moves along said resistance track.

15. The device of claim 2, wherein said program further executable to:

correlate said output voltage of said electrical circuit to a first distance between said pair of arms;

calculate a first circumference of a first circle corresponding to said first distance between said pair of arms;

record said first circumference of said first circle in said non-transitory computer readable medium;

read out said first circumference of said first circle in said measurement units on said numeric display;

correlate said output voltage of said electrical circuit corresponding to a second distance between said pair of arms;

calculate a second circumference of a second circle corresponding to said second distance between said pair of arms;

record said second circumference of said second circle in said non-transitory computer readable medium;

read out said second circumference of said second circle in said measurement units on said numeric display: and calculate a difference in circumference between calculated circumference of said first and second circles recorded in said non-transitory computer readable medium; and read out said difference in circumference between said first and second circles in said measurement units on said numeric display.

\* \* \* \* \*